US009253682B2

(12) United States Patent
Nádas et al.

(10) Patent No.: US 9,253,682 B2
(45) Date of Patent: Feb. 2, 2016

(54) CONGESTION CONTROL IN AN HSPA SYSTEM

(75) Inventors: Szilveszter Nádas, Budapest (HU); Sándor Rácz, Cegléd (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 86 days.

(21) Appl. No.: 14/004,463

(22) PCT Filed: Mar. 29, 2011

(86) PCT No.: PCT/SE2011/050352
§ 371 (c)(1),
(2), (4) Date: Sep. 11, 2013

(87) PCT Pub. No.: WO2012/134360
PCT Pub. Date: Oct. 4, 2012

(65) Prior Publication Data
US 2014/0003243 A1    Jan. 2, 2014

(51) Int. Cl.
*H04W 28/12* (2009.01)
*H04L 12/865* (2013.01)
*H04W 28/02* (2009.01)
*H04L 12/801* (2013.01)
*H04L 12/825* (2013.01)

(52) U.S. Cl.
CPC .......... *H04W 28/0289* (2013.01); *H04L 47/12* (2013.01); *H04L 47/14* (2013.01); *H04L 47/263* (2013.01); *H04W 28/0247* (2013.01); *H04W 28/0252* (2013.01); *H04W 28/12* (2013.01)

(58) Field of Classification Search
None
See application file for complete search history.

(56) References Cited

U.S. PATENT DOCUMENTS

| 2008/0008092 A1* | 1/2008 | Wang et al. ................... 370/235 |
| 2008/0186862 A1* | 8/2008 | Corbett et al. ................ 370/237 |
| 2010/0157803 A1 | 6/2010 | Rivers et al. |
| 2010/0220594 A1 | 9/2010 | Racz et al. |
| 2011/0044168 A1 | 2/2011 | Nadas et al. |

FOREIGN PATENT DOCUMENTS

| WO | 2008066429 A1 | 6/2008 |
| WO | 2009058084 A1 | 5/2009 |

OTHER PUBLICATIONS

Author Unknown, "Technical Specification Group Radio Access Network; Iub/Iur congestion control (Release 7)," Technical Report 25.902, Version 7.0.0, 3GPP Organizational Partners, Sep. 2006, 14 pages.
European Search Report for European Patent Application 11862489.9 mailed May 9, 2014, 5 pages.
(Continued)

*Primary Examiner* — Omar Ghowrwal
(74) *Attorney, Agent, or Firm* — Patent Portfolio Builders, PLLC (57) ABSTRACT

A method for use in a Transport Network, TN, in a Radio Access Network, RAN, in an HSPA enabled cellular system. The method includes inspecting and/or queuing data frames which are sent over at least part of the TN between a Radio Network Controller, RNC, and a NodeB in the cellular system, and using the inspected and queued data frames to identify flows in at least part of the TN and to detect congestion in at least part of the TN. The method further comprises taking a congestion control action using identified flows and/or detected congestion in at least part of the TN.

16 Claims, 5 Drawing Sheets

(56) References Cited

OTHER PUBLICATIONS

Border, J. et al., "Performance Enhancing Proxies Intended to Mitigate Link-Related Degradations," Network Working Group: Request for Comments No. 3135, Jun. 2001, 45 pages, http://tools.ietf.org/html/rfc3135.

Nádas, Szilveszter et al., "Chapter 1: HSPA Transport Network Layer Congestion Control," HSDPA/HSUPA Handbook, 2010, pp. 1-40 (43 total pages).

International Preliminary Report on Patentability for PCT/SE2011/050352, mailed Apr. 25, 2013, 8 pages.

Written Opinion for PCT/SE2011/050352, mailed Dec. 29, 2011, 6 pages.

* cited by examiner

Fig 7

CONGESTION CONTROL IN AN HSPA SYSTEM

This application is a 35 U.S.C. §371 national phase filing of International Application No. PCT/SE2011/050352, filed Mar. 29, 2011, the disclosure of which is incorporated herein by reference in its entirety.

TECHNICAL FIELD

The present invention discloses improved congestion control in an HSPA enabled cellular system.

BACKGROUND

In a cellular system, the Radio Network Controller, RNC, is connected to the Radio Base Station, RBS, via the so called Transport Network, TN. In all cellular systems, and in particular in a cellular system which is enabled for HSPA, High Speed Packet Access, the TN is a potential bottleneck, both in the downlink, DL, and in the uplink, UL, direction.

RFC 3135 (available at www.rfc-archive.org) describes the use of performance enhancing proxies in order to improve degraded TCP performance.

SUMMARY

It is an object of the invention to provide a solution for improved congestion detection and control for the Traffic Network in an HSPA enabled cellular network.

This object is achieved by the invention in that it discloses a method for use in a Transport Network, TN, in a Radio Access Network, RAN, in an HSPA enabled cellular system. The method comprises inspecting and/or queuing data frames which are sent over at least part of the TN between a Radio Network Controller, RNC, and a NodeB in the cellular system, and using the inspected and queued data frames to identify flows in the at least part of the TN and to detect congestion in the at least part of the TN.

The method further comprises taking a congestion control action using identified flows and/or detected congestion in said at least part of the TN .

In embodiments, the method comprises detecting congestion in an identified flow in said at least part of the TN.

In embodiments, the method comprises detecting congestion by means of accessing said at least part of the TN by means of a flow control proxy function.

In embodiments, the method comprises detecting congestion by means of emulating said at least part of the TN by means of a flow control proxy function.

In embodiments, the congestion control action is to perform per flow scheduling of said at least part of the TN.

In embodiments, the congestion control action is to perform bit rate determination of the identified flows and to then inform the RNC about the determined bit rates.

In embodiments, the method further comprises terminating inspected control frames in a flow which is sent over said at least part of the TN.

In embodiments, the method further comprises sending control frames to the RNC or to the NodeB by means of a flow control proxy function in order to solve congestion.

In embodiments, the method is carried out in the uplink direction, i.e. for data frames sent from the NodeB to the RNC, and is performed by the NodeB, or at a Site Integration Unit together with the NodeB, or at a point in the TN between the RNC and the NodeB.

In embodiments, the method comprises the use of Transport Network Layer Congestion Information Control Frames which have been extended with information regarding the rate and/or number of required octets.

In embodiments, the method is carried out in the downlink direction, i.e. for data frames sent from the RNC to the NodeB, and is performed in an RNC or arranged at a site router at an RNC site, or at a point in the TN between the RNC and the NodeB.

The invention also discloses a network node for use in an HSPA enabled cellular system. The network node is arranged to inspect and/or queue data frames which are sent over at least part of a Transport Network, TN, between a Radio Network Controller, RNC, and a NodeB in the cellular system.

The network node is arranged to use the inspected and queued data frames to identify flows in the at least part of the TN and to detect congestion in said at least part of the TN. The network node is also arranged to take a congestion control action using identified flows and/or detected congestion in the at least part of the TN.

In embodiments, the network node is arranged to detect congestion by means of accessing the at least part of the TN using a flow control proxy function.

In embodiments, the network node is arranged to detect congestion by means of emulating said at least part of the TN by means of a flow control proxy function.

In embodiments, the congestion control action is to perform per flow scheduling of said at least part of the TN.

In embodiments, the congestion control action is to perform bit rate determination of the identified flows and to then inform the RNC about the determined bit rates.

In embodiments, the network node is arranged to terminate inspected control frames in a flow which is sent over said at least part of the TN.

In embodiments, the network node is arranged to send control frames to the RNC or to the NodeB by means of a flow control proxy function, in order to solve congestion.

In embodiments, the network node is arranged to carry out its function in the uplink direction, i.e. for data frames sent from the NodeB to the RNC, and the network node is a NodeB or a separate network node arranged at a Site Integration Unit or at a point in the TN between the RNC and the NodeB.

In embodiments, the network node is arranged to carry out its function in the downlink direction, i.e. for data frames sent from the RNC to the NodeB, and the network node is an RNC or a separate network node arranged at a site router at an RNC site or at a point in the TN between the RNC and the NodeB.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

Figure 1:
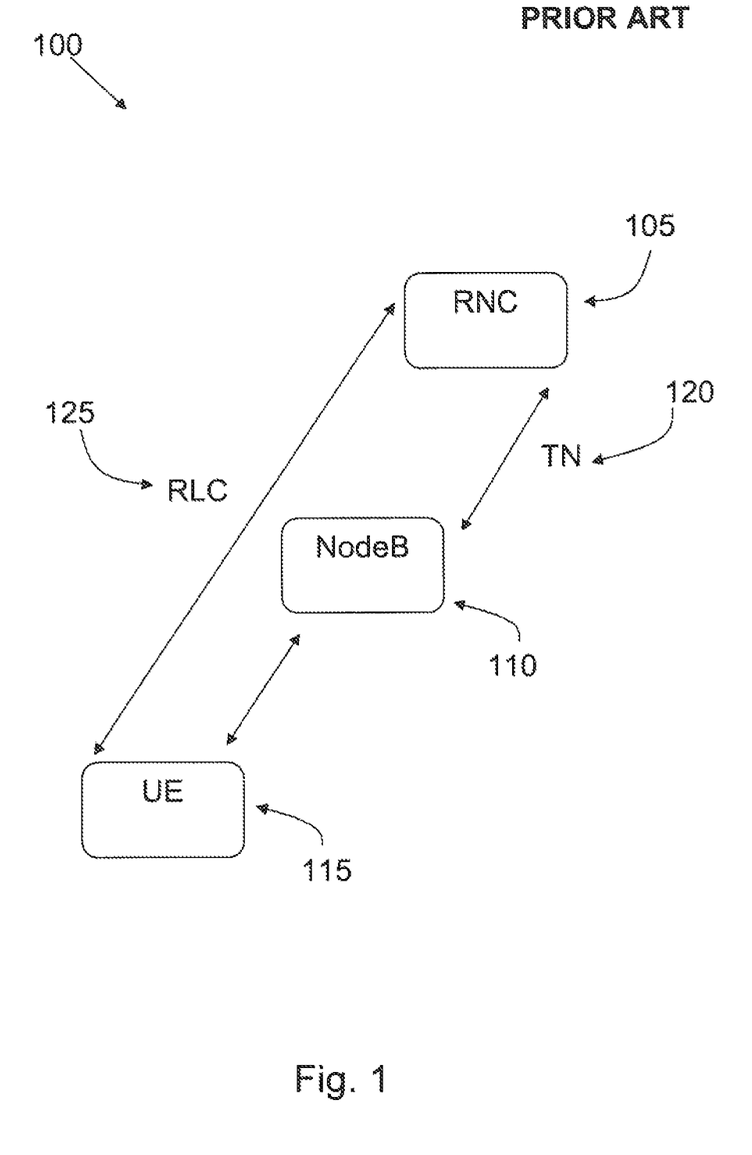
FIG. 1 shows a prior art system.

FIG. 1 shows a schematic overview of a prior art HSPA enabled cellular system 100. The system 100 is a cellular access system enabled for HSPA, High Speed Packet Access, and comprises one or more Radio Network Controllers, RNCs, one of which is shown as 105 in FIG. 1. The RNC 105 is connected to a NodeB 110, also sometimes generically referred to as a Radio Base Station, abbreviated as RBS. The connection between the RNC 105 and the RBS 110 is by means of a so called Transport Network, TN, 107. All traffic to and from a number of User Equipments, UEs 115, is routed through the RBS 110, and is then sent to the RNC 105 via the TN 120. Although FIG. 1 only shows the RNC 105 being connected to one RBS 110 and its UEs 115, an RNC can be, and usually is, connected to more than one RBS at a time, where each RBS has its associated number of UEs.

The traffic from the UEs to the RNC over the TN is sent in so called flows, also referred to as Radio Bearers, RBs, where there can be more than one RB per UE in each direction, i.e. uplink and downlink.

Due to the way that the TN 120 is utilized, as described above, the TN 120 is a potential bottleneck in the system 100. A TN can also be divided into a number of different resources, one or more of which can be a bottleneck, which means that a TN can comprise one or more bottlenecks, while other parts of the same TN are not bottlenecks. This is due to the fact that the TN can be divided into several physical channels, for example a combination of one or more satellite links, landlines and wireless connections.

Figure 2:
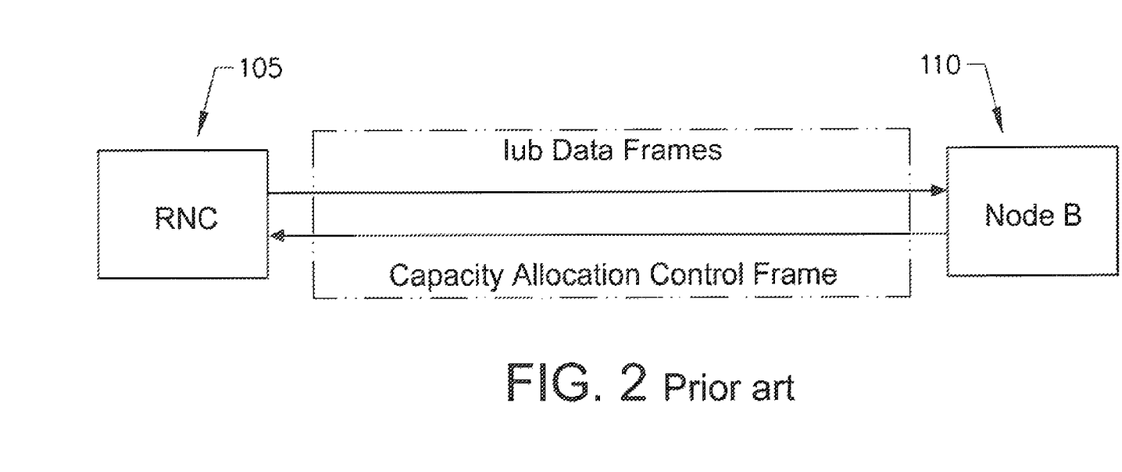
FIG. 2 shows a prior art Transport Network in DL.

FIG. 2 shows another detail of the prior art system of FIG. 1: the RNC 105 transmits so called Iub data frames in the direction of the NodeB 110, i.e. in the so called downlink direction, also abbreviated as DL. In the other direction, i.e. from the NodeB 110 to the RNC 105, the so called uplink, UL, direction, the NodeB 110 transmits Capacity Allocation Control Frames, abbreviated as CA CF. The HSPA technique in the uplink direction is sometimes referred to as HSUPA, and sometimes alternatively as EUL, Enhanced Uplink, an abbreviation which will be used in this text.

As mentioned previously, all or parts of a TN can become a bottleneck, either in the DL or in the UL direction or in both directions. In order to obviate the problem or problems caused by such bottlenecks, the invention discloses a flow control proxy function for a Transport Network such as the one shown in FIG. 1 and described above.

Figure 3:
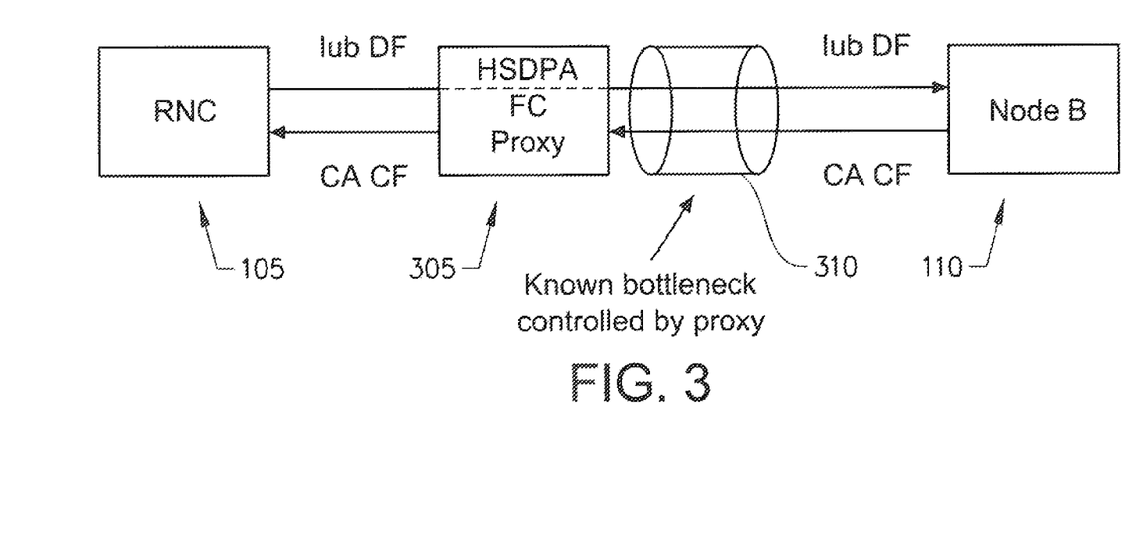
FIG. 3 shows a Transport Network equipped with an embodiment of the invention for DL.

FIG. 3 shows the same details of the system 100 details of FIG. 2, but now also equipped with an embodiment 305 of a flow control proxy function of the invention for use in the DL, downlink, direction. The flow control proxy function 305 is in this embodiment arrange din a network node which can be the RNC 105 or a separate network node arranged at a site router at an RNC site or at a point in the TN 130 between the RNC 105 and the NodeB 110.

In the example of FIG. 3, the flow control ("FC") proxy function 305 has been installed in a part 310 of the Transport Network which has been identified as a bottleneck. The flow control proxy function 305 inspects and queues data frames which are sent over the bottleneck 310 in the DL direction, which is done in order to identify flows over the bottleneck 310 and to detect congestion over the bottleneck 310.

Using the identified flows over the bottleneck 310, the proxy flow control function 305 takes congestion control action in case of detected congestion over the bottleneck 310. The congestion control action can be of various kinds, which will be described in more detail in the following. The choice of congestion control action is decided by such factors as, for example, the proxy flow control function's possibilities of accessing the bottleneck 310, the location in the system of the proxy flow control function and the system configuration.

One kind of congestion control action which the proxy flow control function 305 can take is to perform "per flow" scheduling of the data frames over the bottleneck 310, while another kind of congestion control action which the proxy flow control function 305 can take is to perform bit rate determination of the identified flows and to then inform the RNC 105 about the determined bit rates, so that the RNC 105 can perform the technique known as "rate based Flow Control". These two alternative congestion control actions will be explained in more detail in the following text.

Per Flow Scheduling, DL Embodiment

Figure 4:
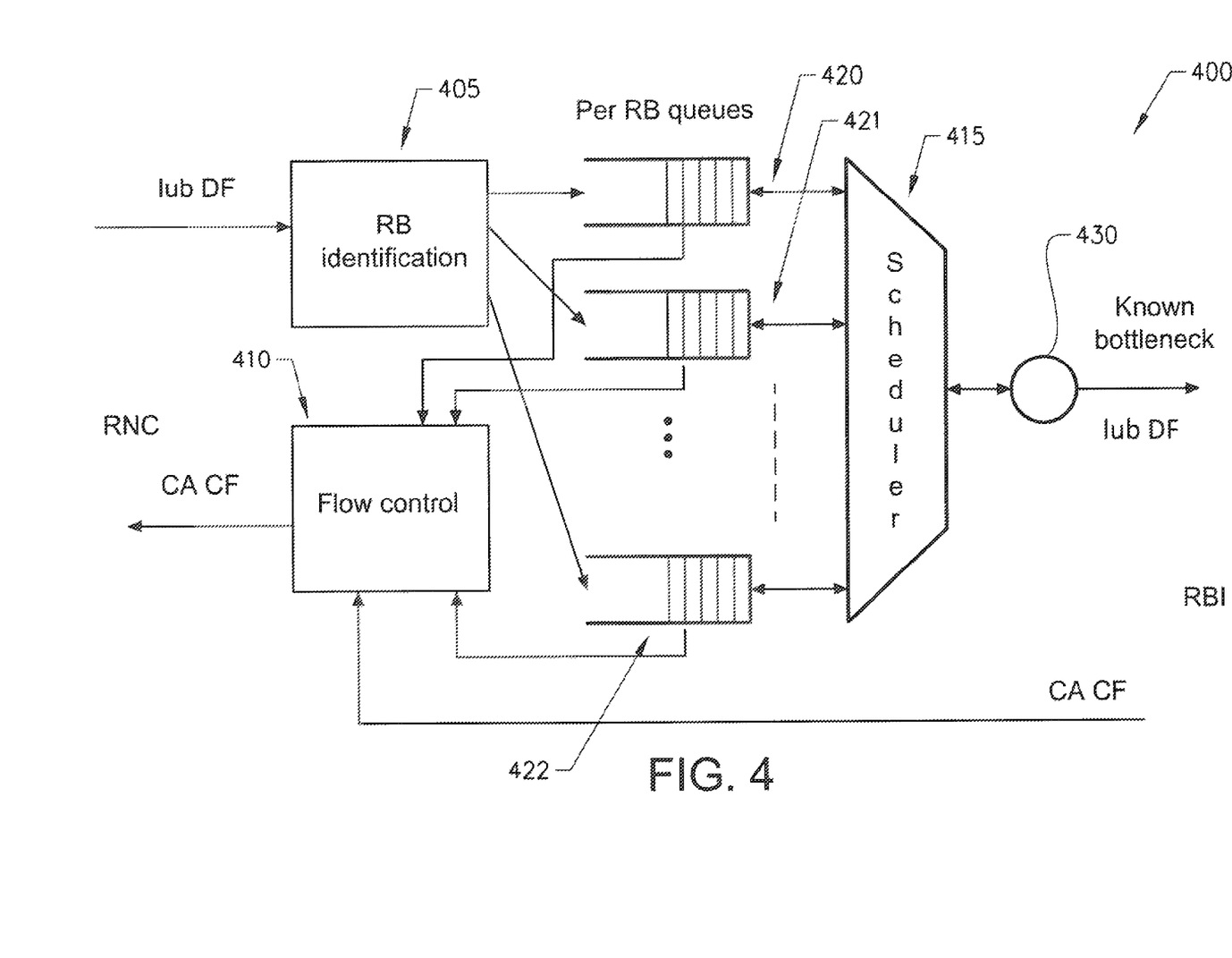
FIG. 4 shows a detailed DL solution of the invention.

An embodiment 400 of the first congestion control action, i.e. the so called "per flow scheduling" is shown in FIG. 4: in this embodiment, the flow control proxy function comprises a function 405 for Radio Bearer, RB, identification, which serves to place incoming Iub frames from the RNC 105 on their way to the RBS 110 into separate queues, one for each Radio Bearer. These separate RB queues are shown as 420 to 422 in FIG. 4. Naturally, as indicated by means of dots in FIG. 4, the number of RB queues can be larger or smaller than 3, which is an example only. The detection congestion is in this embodiment carried out based on the "buffer" level of the RB queues, where the buffer level can be defined in octets or in milliseconds (latency).

The flow control proxy function 400 also comprises a separate function 410 for flow control. The flow control function 410 serves to control the length of the RB queues 420-422, so that the size of the queues falls within the limits of an upper and a lower boundary which are set, preferably by the system operator, in order to achieve a good balance between low latency and high utilization.

Alternatively, flow control function 410 can directly trigger refilling of the RB queues 420-422 from the RNC by a given amount of octets, which is suitably done when the Round Trip Time, RTT, between the RNC and the flow control proxy function 400 is relatively small, for example in the interval of 0-200 ms, suitably in the interval of 0-50 ms.

The flow control function 410 suitably triggers this refilling of the RB queues from the RNC by means of sending a Capacity Allocation Control Frame to RNC indicating the amount of Protocol Data Units, PDUs, (i.e. corresponding to the desired number of octets) that the RNC should send in the direction of the RBS.

The flow control function 410, as shown in FIG. 4, receives Iub data frames, Iub DF, from the RB queues 420-422 and CA CFs from the RBS, and transmits CA CFS to the RNC. The flow control function 410 also receives information about the state of the RB queues 420-422, as indicated by means of arrows from the RB queues to the flow control function 410 in FIG. 4.

As indicated in FIG. 4, the flow control proxy function 400 also comprises a scheduler function 415. The scheduler function 415 schedules the different Radio Bearer queues according to their priority, e.g. according to the principles known as "Round Robin" or "Weighted Fair Queuing", so that Iub DFs are transmitted from the scheduler 415 over the known bottleneck 430 in this order, i.e. as scheduled. Scheduler function decisions are always triggered when the TN (or rather, the part of the TN on which the proxy flow control function 400 is arranged to control) is able to serve an HSDSCH (High Speed Downlink Shared Channel) Iub Data Frame.

It should be pointed out that not only HSDPA traffic is transported on the TN 120, but also other user plane traffic and control plane traffic.

Rate Based Flow Control, DL Embodiment

In this embodiment, the congestion indication is not directly detected; instead the behaviour of the known TN bottleneck is emulated by the flow control proxy, and the congestion detection is triggered based on this emulation.

This emulation of the TN bottleneck is possible since the flow control proxy is, in this embodiment, arranged to know the exact speed, scheduling and buffering of the TN bottleneck, and since all traffic going through the TN bottleneck also goes through the flow control proxy.

In this embodiment, the TN part of the flow control in the Node B can also be switched off. The flow control proxy of this embodiment is able to detect TN congestion between the RNC and the proxy and act on that as well. In addition, the flow control proxy can take into account air interface congestion actions as represented by CA CFs received from the Node B.

EUL Embodiments

Figure 5:
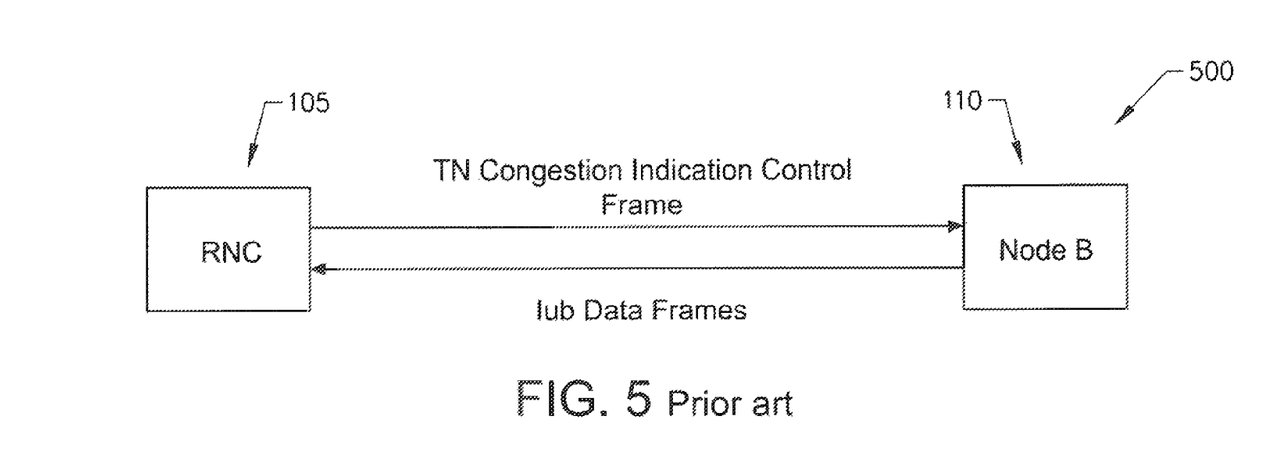
FIG. 5 shows a prior art Transport Network in UL.

FIG. 5 shows an embodiment of prior art EUL use of the TN between the RNC 105 and the NodeB ("RBS") 110 from FIGS. 1 and 2. The RNC 105 transmits TN Congestion Indication Control Frames, TN CI CFs, to the NodeB 110, either when there is congestion, or constantly, in which case the TN CI CFs indicate congestion or no congestion. The NodeB 110 transmits Iub Data Frames to the RNC 105.

Figure 6:
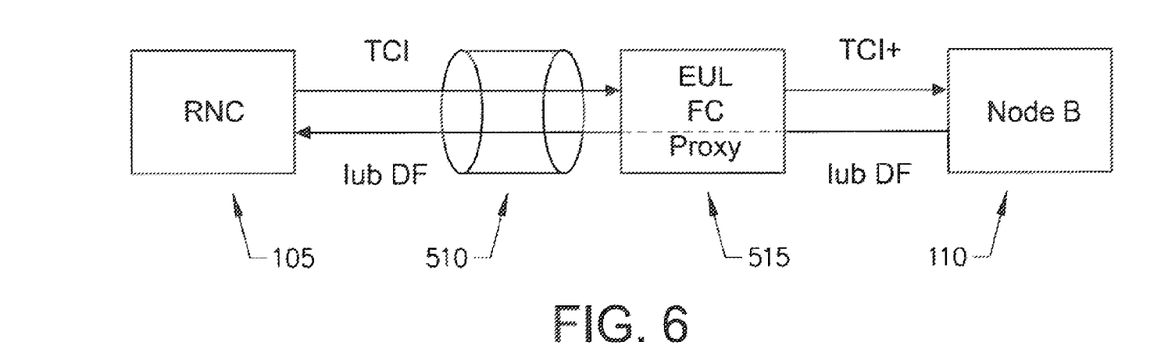
FIG. 6 shows a Transport Network equipped with an embodiment of the invention for UL.

FIG. 6 shows the TN of FIG. 5, but now equipped with an embodiment of an EUL (Enhanced Uplink) Flow Control ("FC") Proxy function 515 of the invention. The flow control proxy function 515 is here arranged in a network node which can be the NodeB 110 or a separate network node arranged at a Site Integration Unit or at a point in the TN 130 between the RNC 105 and the NodeB 110.

The EUL Flow Control Proxy function 515 is placed at a known bottleneck 510 in the TN, which can either be the entire TN as such, or one or more parts of the TN which have been identified as bottlenecks.

The EUL Flow Control Proxy function 515 emulates and/or controls the bottleneck 510, and can thereby detect congestion, and take congestion control action when congestion occurs or is about to occur.

The congestion control action is in one embodiment to perform Flow Control (FC) of the TN or part of the TN at which it is arranged, while it in another embodiment is to perform "per flow scheduling" over the bottleneck 510, thereby keeping the TN scheduling queues at a level which is below a predefined threshold.

The Flow Control, "FC", embodiment is similar to that described above in connection to the DL embodiment, and will for that reason not be described in further detail here.

In the "per flow scheduling" embodiment, the Transport Network Layer, TNL, Congestion Information Control Frames (TCIs) have been extended with information regarding the rate and/or number of required octets required for a certain RB queue length, which is shown as TCI+ in FIG. 6. TCI+ is used by the EUL FC Proxy 515 in order to communicate the rate and and/or number of required octets information to the NodeB, where it is used by the Node B unit known as the EUL air interface scheduler.

In the "per flow scheduling" embodiment, TCIs received by the EUL FC Proxy 515 from the RNC 105 can be forwarded to the Node B 110, or they can be used to determine when to send a TCI+ message. Either way, the control loop RTT (Round Trip Time) is reduced to the RTT between the Node B 110 and the EUL FC Proxy 515, instead of the RTT between the RNC 105 and the Node B 110, which can be a significant difference, for example when the bottleneck 510 controlled by the EUL FC Proxy 515 is a satellite link In the case of the "per flow scheduling" embodiment and small RTT values between the Node B 110 and the EUL FC Proxy 515, a very high TN utilization and very good TN fairness can be reached by directly requesting the NodeB 110 to refill the EUL FC Proxy 515 scheduling queues to a certain predefined level.

Figure 7:
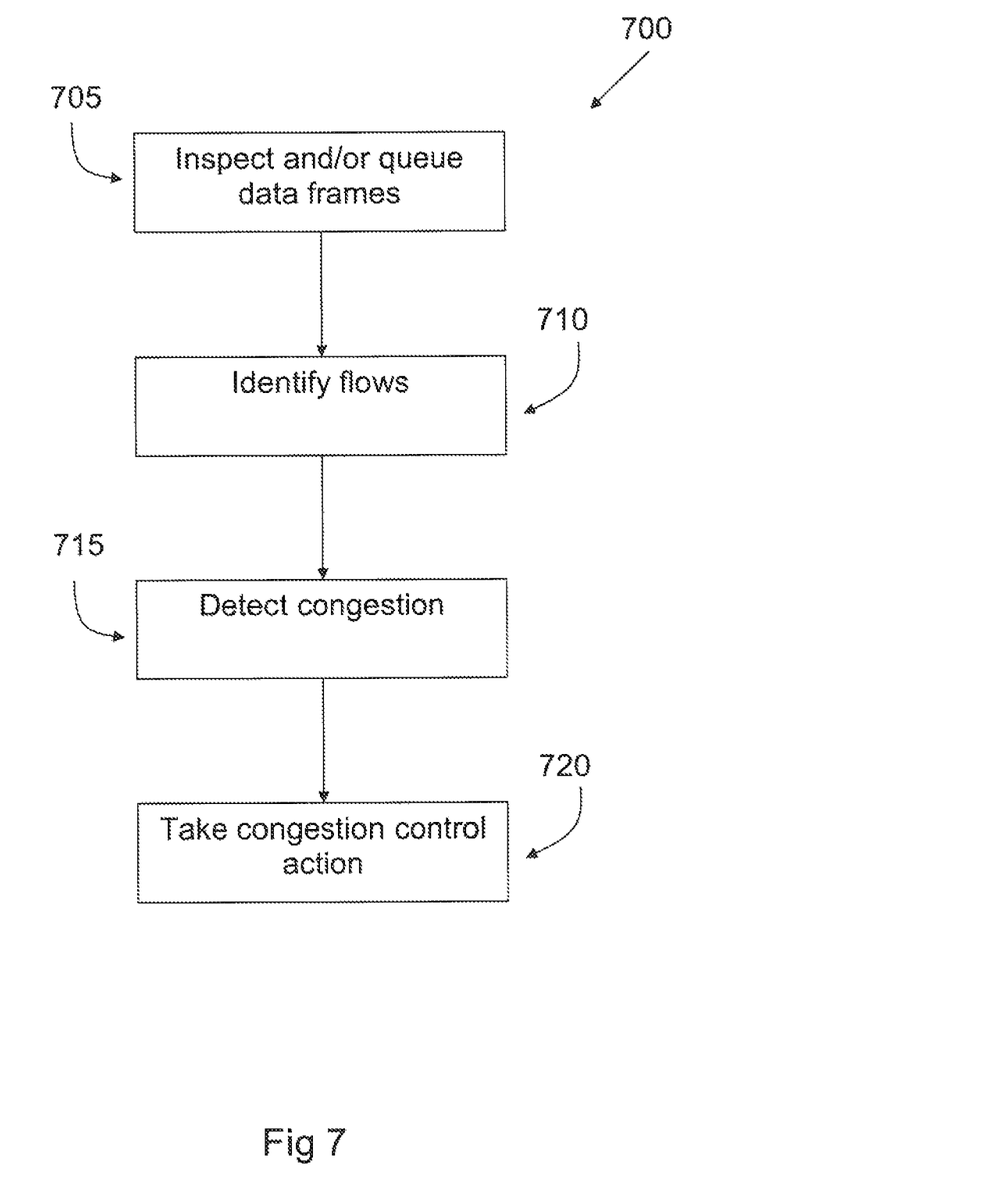
FIG. 7 shows a flow chart of a method of the invention.

FIG. 7 shows a flow chart of a method 700 of a method of the invention. The method 700 is intended for use in a Transport Network, TN, in a Radio Access Network, RAN, in an HSPA enabled cellular system. As shown in step 705, the method 700 comprises inspecting and/or queuing data frames which are sent over at least part of the TN between a Radio Network Controller, RNC, and a NodeB in the cellular system, and using the inspected and queued data frames to identify flows, step 710, in said at least part of the TN and to detect congestion, step 715, in said at least part of the TN. As shown in step 720, the method 700 further comprises taking a congestion control action using identified flows and/or detected congestion in said at least part of the TN.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method of operation of a network node in a Transport Network, TN, in a Radio Access Network, RAN, in an HSPA enabled cellular system, the method comprising:
    inspecting and queuing at least some data frames which are sent over at least part of the TN between a Radio Network Controller, RNC, and a NodeB in the cellular system,
    using the inspected and queued data frames to identify flows in said at least part of the TN and using the inspected and queued data frames to detect congestion in said at least part of the TN, the method further comprising taking a congestion control action using the identified flows and/or the detected congestion in said at least part of the TN, the method comprising detecting congestion by accessing said at least part of the TN by using a flow control proxy function; and
    sending control frames to the RNC or to the NodeB using the flow control proxy function, wherein the control frames comprise information regarding an amount of octets to be sent by the RNC for refilling queues for the identified flows.

2. The method of claim 1, comprising detecting congestion in an identified flow in said at least part of the TN.

3. The method of claim 1, in which the congestion control action is to perform per flow scheduling of said at least part of the TN.

4. The method of claim 1, in which the congestion control action is to perform bit rate determination of the identified flows and to then inform the RNC about the determined bit rates.

5. The method of claim 1, further comprising terminating inspected control frames in a flow which is sent over said at least part of the TN.

6. The method of claim 1, being carried out in an uplink direction, which is for data frames sent from the NodeB to the RNC, the method being performed by the NodeB, or at a Site Integration Unit together with the NodeB, or at a point in the TN between the RNC and the NodeB.

7. The method of claim 1, comprising the use of Transport Network Layer Congestion Information Control Frames which have been extended with information regarding a rate and/or number of required octets.

8. The method of claim 1, being carried out in a downlink direction, which is for data frames sent from the RNC to the NodeB, the method being performed in the RNC or arranged at a site router at an RNC site, or at a point in the TN between the RNC and the NodeB.

9. A network node for use in an HSPA enabled cellular system, the network node-comprising:
    a processor; and
    memory containing instructions executable by the processor to cause the network node to:
        inspect and queue at least some data frames which are sent over at least part of a Transport Network, TN, between a Radio Network Controller, RNC, and a NodeB in the cellular system,
        use the inspected and queued data frames to identify flows in said at least part of the TN and use the inspected and queued data frames to detect congestion in said at least part of the TN,
        take a congestion control action using the identified flows and/or the detected congestion in said at least part of the TN, the network node being arranged to detect congestion by accessing said at least part of the TN using a flow control proxy function; and
        send control frames to the RNC or to the NodeB by using the flow control proxy function wherein the control frames comprise information regarding an amount of octets to be sent by the RNC for refilling queues for the identified flows.

10. The network node of claim 9, in which the congestion control action is to perform per flow scheduling of said at least part of the TN.

11. The network node of claim 9, in which the congestion control action is to perform bit rate determination of the identified flows and to then inform the RNC about the determined bit rates.

12. The network node of claim 9, being arranged to terminate inspected control frames in a flow which is sent over said at least part of the TN.

13. The network node of claim 9, being arranged to carry out its function in an uplink direction, which is for data frames sent from the NodeB to the RNC, the network node being the NodeB or a separate network node arranged at a Site Integration Unit or at a point in the TN between the RNC and the NodeB.

14. The network node of claim 9, being arranged to carry out its function in a downlink direction, which is for data frames sent from the RNC to the NodeB, the network node being the RNC or a separate network node arranged at a site router at an RNC site or at a point in the TN between the RNC and the NodeB.

15. The network node of claim 10, wherein to perform per flow scheduling comprises:
    scheduling the inspected and queued data frames in the network node of the TN according to a respective priority; and
    transmitting the inspected and queued data frames from the network node of the TN in accordance with an order defined by the respective priority of the inspected and queued data frames.

16. A method of operation of a network node in a Transport Network, TN, in a Radio Access Network, RAN, in an HSPA enabled cellular system, the method comprising:
    inspecting and queuing at least some data frames which are sent over at least part of the TN between a Radio Network Controller, RNC, and a NodeB in the cellular system;
    using the inspected and queued data frames to identify flows in said at least part of the TN and using the inspected and queued data frames to detect congestion in said at least part of the TN;
    taking a congestion control action to perform per flow scheduling of said at least part of the TN using the identified flows and/or the detected congestion in said at least part of the TN, wherein performing per flow scheduling comprises scheduling the inspected and queued data frames in the network node of the TN according to a respective priority, and transmitting the inspected and queued data frames from the network node of the TN in accordance with an order defined by the respective priority of the inspected and queued data frames; and
    sending control frames to the RNC or to the NodeB, wherein the control frames comprise information regarding an amount of octets to be sent by the RNC for refilling queues for the identified flows.

\* \* \* \* \*